United States Patent Office

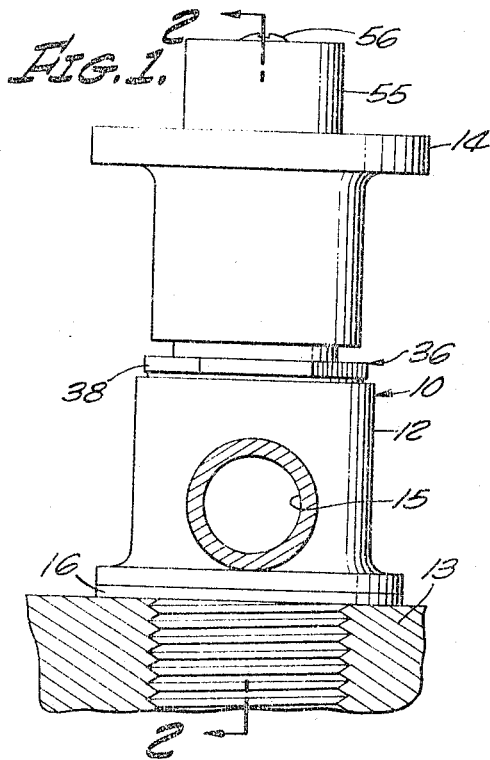
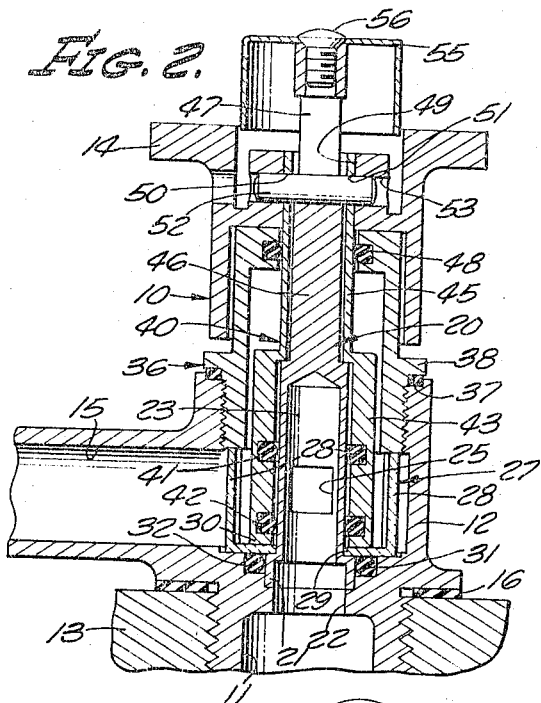
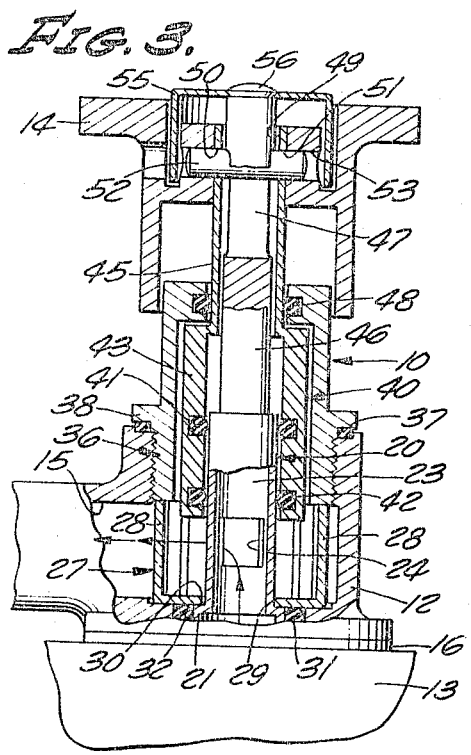
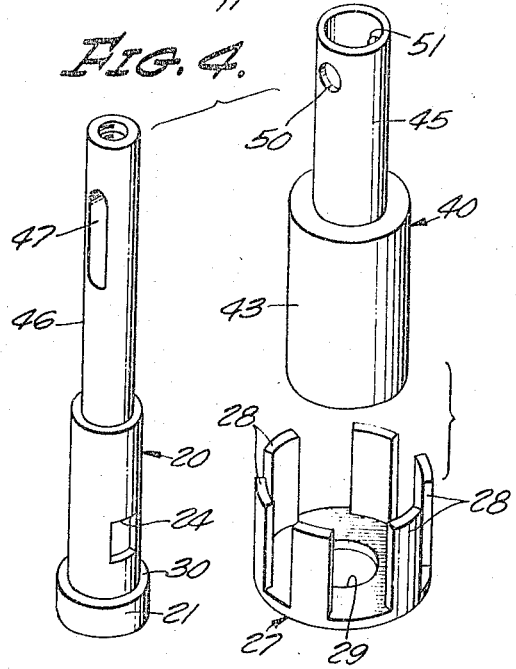
INVENTORS.
ERNEST H. BUCKNELL
IRVING A. WARD
BY
Lyon & Lyon
ATTORNEYS

3,324,879
Patented June 13, 1967

3,324,879
FAUCET VALVE WITH STATIONARY INLET TUBE
Ernest H. Bucknell and Irving A. Ward, Los Angeles, Calif., assignors to the estate of Ralph E. Bletcher, deceased (10%); Frederick Robertson (5%); Gary Robertson (5%); Lenora Bucknell (10%); Richard H. Bletcher (10%); Dan G. Liston (10%); Dan G. Liston as trustee for Daniel E. Liston (5%); Dan G. Liston as trustee for Carol Ann Liston (5%); James H. Liston (5%); Hazel Brondum (10%); Pearl Bletcher (10%); Marcia Liston (5%); Ernest H. Bucknell (10%)
Filed Oct. 22, 1965, Ser. No. 501,242
7 Claims. (Cl. 137—454.6)

This invention relates to a valve and more particularly to an improved faucet valve for turning on and off an inlet fluid as well as varying the volume of flow thereof.

Typical faucet valves include a stationary member and a rotatable member, the latter being rotatable and longitudinally movable by means of screw threads to variably separate sealing means from an opening to allow fluid to pass therethrough. The present invention provides an improved faucet valve utilizing only longitudinal movement of a movable member to turn on and off and to vary the fluid flow through the faucet.

It is an object of the present invention to provide an improved balanced control valve for turning on and off and varying fluid flow.

It is an additional object of this invention to provide an improved faucet valve requiring only longitudinal movement of a movable member thereof to turn on and off and to vary fluid flow.

It is a further object of this invention to provide an improved faucet valve of relatively simple construction and having easily operated control means.

In accordance with an exemplary embodiment of the teachings of the present invention, an improved faucet valve is provided having a stationary inlet tube or plug and a sleeve mounted coaxially thereover. Longitudinal movement of the sleeve with respect to the plug turns on and off and varies the fluid flow through the port in the plug and, hence, through the faucet.

These and other objects and features of this invention will become more apparent through a detailed consideration of the following description taken in conjunction with the accompanying drawing in which:

FIGURE 1 is an end elevation of a valve embodying the present invention;

FIGURE 2 is a side sectional view of the valve taken along the line 2—2 of FIGURE 1, and illustrates the "off" position thereof;

FIGURE 3 is a side sectional view similar to that illustrated in FIGURE 2, and shows the valve in an "on" position;

FIGURE 4 is an exploded perspective view of certain of the components of the valve.

The drawing illustrates a faucet valve 10 constructed in accordance with the teachings of this invention, and through which the flow of a liquid, such as water, supplied through an inlet 11 in a body 12 attached to a fitting or base 13 is controlled by a knob 14 and discharged through an outlet 15. A gasket 16 may be provided between the body 12 and the base 13. As will appear subsequently, the knob 14 is movable longitudinally (up and down as shown in the figures) for turning on and off and varying the volume of flow of liquid through the valve.

A tubular member or plug 20 has an enlarged flange 21 at the lower end thereof seated against a shoulder in a bore 22 within the body 12. The plug 20 includes a bore or internal chamber 23 and a plurality of discharge ports 24 and 25 which communicate through the chamber 23 with the inlet 11. A retainer in the form of a "castellated" washer 27, including a base and a plurality of upright fingers 28 separated by slots depending therefrom, has a hole 29 in its base fitting over the lower extremity of the plug 20 and abutting a shoulder 30 thereon. An O-ring 31 seated in an anular groove 32 in the body 12 provides a seal between the body 12, flange 21, and base of the washer 27. A cap nut 36 is screw threaded into the upper portion of the body 12, and the lower end of the cap nut abuts the upper ends of the fingers 28 thereby securing the washer 27 and the plug 20 rigidly with respect to the body 12. A suitable gasket 37 may be provided between a flange 38 on the cap nut 36 and the upper end of the body 12.

A sleeve 40 is mounted coaxially over the plug 20. A pair of O-rings 41 and 42 are seated within internal grooves in a lower portion 43 of the sleeve 40 to provide a suitable seal for the ports 24 and 25 between the plug 20 and the sleeve 40. The sleeve 40 includes an upper portion 45 having a reduced diameter which is mounted over an upper end 46 of the plug 20. The end 46 preferably is solid and includes an elongated slot 47 therein. The portion 45 of the sleeve 43 extends through a bore in the upper end of the cap nut 38 having an O-ring 48 seated in a groove therein, and through a central bore 49 in the knob 14. The upper end of the portion 45 further includes aligned holes 50 and 51. The knob 14 is positioned over the portion 45 of the sleeve 40 and is secured thereto by means of a pin 52 which is seated within a transverse bore 53 in the plug 14 and extends through the holes 50 and 51 of the sleeve 40 and the slot 47 of the plug 20. The slot 47 is slightly wider than the diameter of the pin 52 to allow free movement of the pin from one end to another of the slot 47. The length of the slot 47 thus limits the longitudinal movement of the sleeve 40. A cover or thumb rest 55 is secured to the upper extremity of the plug 20 by means of a screw 56.

The knob 14 may be moved up and down (the thumb rest enabling leverage) which in turn longitudinally moves the sleeve 40 with respect to the plug 20. The faucet valve is in an off position when the sleeve 40 is positioned as shown in FIGURE 2. When the knob 14 is raised to the position shown in FIGURE 3, water may pass from the inlet 11, through the bore 22, the chamber 23, the ports 24 and 25 in the plug 20, and the slots between the fingers 28 of the washer 27 to the outlet 15. Intermediate positions of the sleeve 40 select the desired volume of flow.

It will be understood that although an exemplary embodiment of the present invention has been disclosed and discussed, other applications and structural arrangements are possible. Thus, the embodiment disclosed in detail may be subjected to various changes, modifications, and substitutions without necessarily departing from the spirit of the invention.

What is claimed is:
1. A faucet valve comprising a body having an inlet and an outlet,
   plug means seated in said body and having a port therein communicating with said inlet,
   retainer means having a plurality of apertures therein, said retainer means engaging a portion of said plug means for retaining the latter in its seat,
   sleeve means mounted over said plug means and longitudinally movable to expose said port to thereby vary fluid flow from said inlet through said port and apertures to said outlet, and
   cap means secured to said body and engaging a portion of said retainer means thereby securing said plug means and retainer means in a fixed relation with said body.
2. A faucet valve comprising a body having an inlet and an outlet, plug means seated in said body having an opening adapted to receive fluid along the longitudinal axis of said plug means, and having a port approximately normal to the longitudinal axis thereof communicating with said inlet, retainer means having a plurality of apertures therein, said retainer means arranged about a portion of said plug means for retaining the plug means seated in said body, sleeve means mounted over said plug means and longitudinally movable to expose said port to thereby vary fluid flow from said inlet through said port and apertures to said outlet, and cap means secured to said body and engaging a portion of said retainer means thereby securing said plug means and retainer means in a fixed relation with said body.

3. A faucet valve comprising a body having an inlet and an outlet, plug means seated in said body and having a port therein communicating with said inlet, said plug means having an end with a slot therein, retainer means having a plurality of apertures therein, said retainer means engaging a portion of said plug means for retaining said plug means seated in said body, sleeve means coaxially mounted over said plug means and longitudinally movable to expose said port to thereby vary fluid flow from said inlet through said port and apertures to said outlet, means coupling said sleeve means with said slot in said end of said plug means for limiting the longitudinal movement of said sleeve means, and cap means secured to said body and engaging a portion of said retainer means thereby securing said plug means and retainer means in a fixed relation with said body.

4. A faucet valve comprising a body having an inlet and an outlet, plug means seated in said body and having a port therein communicating with said inlet, retainer means including a washer member having a plurality of fingers depending therefrom, said washer member having a central aperture for engaging a shoulder on an end of said plug means for retaining said plug means seated in said body, sleeve means mounted over said plug means and longitudinally movable to expose said port, and cap means secured to said body and engaging said fingers of said retainer means to thereby secure said plug means and retainer means in a fixed relation with said body.

5. A faucet valve comprising a body having an inlet and outlet, plug means seated in said body and having a port therein communicating with said inlet, said plug means having a slot therein near an end thereof and having cover means attached to said end, retainer means having a plurality of apertures therein, said retainer means engaging a portion of said plug means for retaining said plug means seated in said body, sleeve means coaxially mounted over said plug means and longitudinally movable to expose said port to thereby vary fluid flow from said inlet through said port and apertures to said outlet, knob means mounted on an end of said sleeve means and including a pin extending through said slot in said end of said plug means for limiting the longitudinal movement of said sleeve means, and cap means secured to said body and engaging a portion of said retainer means thereby securing said plug means and retainer means in a fixed relation with said body.

6. A faucet valve comprising a body having an inlet and an outlet, plug means seated in said body and having a port therein communicating with said inlet, said plug means having an end with a slot therein, retainer means including a washer member having a plurality of fingers depending therefrom, said washer member having a central aperture for engaging a shoulder on an end of said plug means for retaining said plug means seated in said body, sleeve means coaxially mounted over said plug means and longitudinally movable between said plug means and said plurality of fingers to expose said port to thereby vary fluid flow from said inlet through said port and between said fingers to said outlet, means coupling said sleeve means and said slot in said end of said plug means for limiting the longitudinal movement of said sleeve means, and cap means secured to said body and engaging said fingers of said retainer means to thereby secure said plug means and retainer means in a fixed relation with said body.

7. A faucet valve comprising a body having an inlet and an outlet, plug means seated in said body and having a port therein communicating with said inlet, said plug means having an end with a slot therein, retainer means including a washer member having a plurality of fingers depending therefrom, said washer member having a central aperture for engaging a shoulder on an end of said plug means for retaining said plug means seated in said body, sleeve means coaxially mounted over said plug means and longitudinally movable between said plug means and said plurality of fingers to expose said port to thereby vary fluid flow from said inlet through said port and between said fingers to said outlet, sealing means carried by said sleeve means to seal said port when said sleeve means is moved to a closed position, means coupling said sleeve means with said slot in said end of said plug means for limiting the longitudinal movement of said sleeve means, and cap means secured to said body and engaging said fingers of said retainer means to thereby secure said plug means and retainer means in a fixed relation with said body.

References Cited
UNITED STATES PATENTS

| | | | |
|---|---|---|---|
| 359,948 | 3/1887 | Wilson | 137—625.3 X |
| 1,938,943 | 12/1933 | Terry | 251—325 X |
| 2,642,254 | 6/1953 | Armstrong | 137—625.3 X |

M. CARY NELSON, *Primary Examiner.*

A. ROSENTHAL, *Assistant Examiner.*